United States Patent [19]

Vierstraete

[11] 4,304,512

[45] Dec. 8, 1981

[54] MACHINE TOOLS

[76] Inventor: Jean Vierstraete, 83, rue Victor Hugo à Oignies, Pas-de-Calais, France

[21] Appl. No.: 81,465

[22] Filed: Oct. 3, 1979

[30] Foreign Application Priority Data

Oct. 6, 1978 [FR] France .................. 78 28960

[51] Int. Cl.³ .................. B23C 1/06; B23C 1/13; B23Q 3/06
[52] U.S. Cl. .................. 409/80; 83/925 CC; 144/134 A; 408/95; 409/141; 409/178; 409/191; 409/903
[58] Field of Search .......... 409/226, 227, 235, 903, 409/229, 137, 141, 175, 178, 180, 190, 191, 80; 144/134 R, 134 A, 134 B, 134 C, 136 R, 252 R; 408/95, 98, 112; 269/134, 135, 289 MR; 83/925 CC

[56] References Cited

U.S. PATENT DOCUMENTS

| | | | |
|---|---|---|---|
| 3,418,883 | 12/1968 | Leibow | 409/138 |
| 3,587,391 | 6/1971 | Pitts et al. | 409/235 |
| 3,877,833 | 4/1975 | Thornton et al. | 409/186 |
| 4,158,987 | 6/1979 | Smith | 409/190 X |

Primary Examiner—Z. R. Bilinsky
Attorney, Agent, or Firm—Robert E. Burns; Emmanuel J. Lobato; Bruce L. Adams

[57] ABSTRACT

A machine for machining sheets comprises an arrangement for compressing the sheets to be machined. The arrangement is rotatable about a longitudinal axis comprises at least two rollers for bearing resiliently against the sheets during machining, each of which rollers are rotatable about a transverse axis perpendicular to said longitudinal axis. The arrangement is driven by a motor via a pinion, which motor also drives reduction gearing connected to an angular control means whereby it is possible to control the angular position of the arrangement so that the axis of rotation of the rollers can be orientated in relation to the direction of machining. The control means are themselves controlled by programmable electronic means which operate with reference to the angular position of the machining head of the machine.

4 Claims, 3 Drawing Figures

MACHINE TOOLS

The invention relates to a device designed for machining flat parts and in particular for cutting out by milling metal sheets which are in one piece or stacked one on the other, a device for compressing the parts, which is fixed to the milling head carries out a rotary movement whose axis of rotation corresponds to the axis of rotation of the machining tool, this movement being controlled by the digital control of the machine which always locates the axis of alignment of the means for compressing the metal sheets at right angles to the line of movement of the tool.

Machines for cutting out by milling already exist, in particular in aeronautical factories and are designed in order to obtain, either by copying, or by digital control, a format of stacked parts in order to provide a maximum admissible thickness.

For this, the parts are previously cut out roughly and externally by any means, drilled in order to be able to be secured by rivetting to an assembly and interconnected on the machining table, the milling may thus, by means of a side and face cutter, shape the format in order to give it an appropriate shape, the parts are then dis-connected, drilled according to the required geometry, then bent into the prescribed shape, this practice thus has the following disadvantages:

considerable handling operations, the loss of metal due to the necessity for initial rough cutting out, a considerable waste of time, hence a low output, multiplication of the machining stations, the necessity of retrieving the milled parts in order to drill them, the impossibility of obtaining several parts directly by milling, from one commercially available format of metal sheet, the necessity of providing a considerable number of securing points in order to prevent vibration of the parts during the cutting out operation.

The present invention intends to remedy these drawbacks.

The invention as characterised in the claims resolves these problems by ensuring constant compression of the thickness to be machined close to the tool which carries out the machining, the axis of alignment of the means for the compression of the metal sheet or sheets being kept constantly perpendicular to the line of movement of the tool.

The advantages obtained by this invention are as follows:

better retention, close to the tool, which is thus exempted vibrations, from which it is possible to achieve a higher machining output and thus a shorter operating time, a smaller number of securing points, possibility of machining a format having a large surface area, thus making it possible to obtain several parts therefrom, since there is only one starting reference, the possibility of previously drilling this large format and obtaining finished parts which have been drilled and cut out and thus eliminating the further operations, utilising the surface area of the metal sheet to the optimum by providing overlapping of the parts, which reduces the percentage wastage, reducing the number of machining stations and facilitating the installation of an inline production unit combining several machines having different functions, generally known as a "transfer group".

The invention is described in more detail hereafter with reference to the drawings illustrating one non-limiting embodiment.

Figure 1:
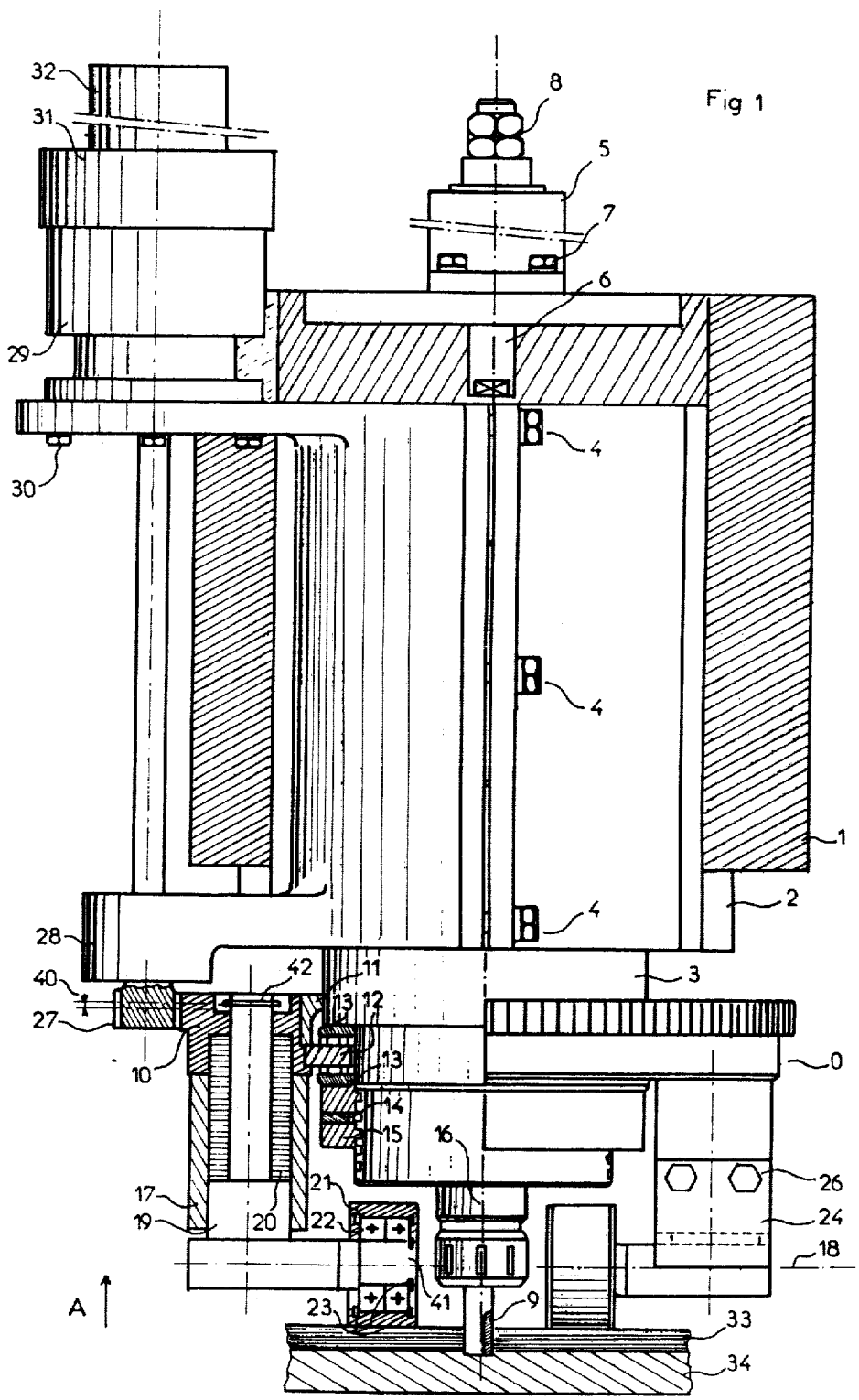
FIG. 1 is a front view of a milling head and a half-sectional view of a rotary device for the compression of the part or parts during the machining operation, the latter being carried out with angular indexing.
Figure 2:
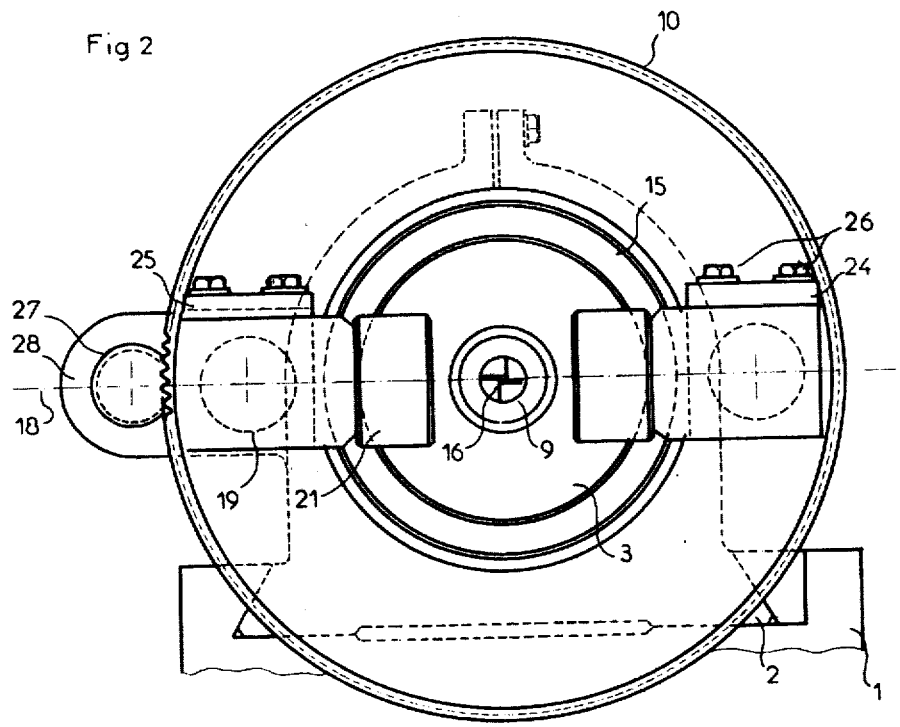
FIG. 2 is an underneath view in the direction of arrow A, of the same arrangement.

The drawings show the arrangement of devices for machining, compression and rotation (O) and for controlling this circular movement.

Its basic construction comprises a saddle 1 forming a slide on which a ram 2 slides, which ram is connected to the spindle 3 by securing means 4, the means for controlling the descent, which may advantageously be a pneumatic, hydraulic, mechanical, electrical or other jack 5 comprising a double rod, acts on the ram 2 through the intermediary of the rod 6, which is in turn secured to the saddle 1 by screws 7, an arrangement 8 comprising a nut and lock-nut, screwed onto the second rod, makes it possible to regulate the depth of the descending movement of the cutting tool 9, whilst respecting a certain clearance 40 below the circlip 42 in order to ensure effective compression of the part during machining.

The spindle 3 supports a toothed ring 10 through the intermediary of two needle bearings 13, the clearance of which, on the central plates 12, is adjusted by the nut 15 locked by the screw 14, this said plate 12 is retained on the ring 10 by the self-lubricating nut 11, itself locked by a screw, not shown in the drawings, this ring thus rotates in alignment with the axis of rotation 16 of the tool 9.

This ring 10 is integral with at least two posts 17, of outer square section, located at an angle of 180° from each other and on an axis 18 passing through the axis of rotation 16 and perpendicular to the latter, these two posts are bored out in order to receive two rods 19 with shoulders, bearing on compression washers 20 limited in their lower travel by the circlip 42, each perpendicular extension of these two rod receives, on the axis 41, a roller 21 through the intermediary of bearings 22 retained by circlips 23, the alignment, with respect to the axis 18, of these compression blocks is ensured by two plates 24, 25, each secured by screws 26 to the two posts 17.

A shafted pinion 27, meshing with the toothed ring 10, rotates on bearings constituted by roller bearings, which are not shown in the drawing, in the housing 28, the opposite end of the pinion 27 is connected, by suitable means, to the D.C. motor 29 fixed to the ram 2 by screws 30, this said motor receives reduction gearing 31 having the same reduction ratio as the pinion/ring arrangement 27, 10, and the axial control means 32, which may advantageously be a turret, will rotate in a ratio of 1:1 of the ring 10, facilitating the control by digital means of the angular positioning of the latter and thus of the axis of alignment of the compression means 18, this method being currently used in digital controls.

Three principles of machines may be adopted:

either a fixed milling head, in this case the supporting table, or the parts to be machined, carry out an intersecting movement XY, or a movable head, on a ram (axis Y) associated with a movement of the table (X) perpendicular to the axis Y, the part or parts moving, but only in one direction, or a movable machine, in this case the machine carries out a movement X, the milling head moving transversely on the slides of the machine on the axis Y, the part being fixed during machining, we shall adopt this solution as the example for describing the operation.

As we have seen, the part 33 may be the result of stacking several metal sheets of the same format, limited to a predetermined maximum thickness, thus, after drilling, these metal sheets will be rivetted on a support 34, which may advantageously be agglomerated wood, or to a fixed table, or to a support for a part clamped on the machine, which is the case of in-line machining by a "transfer group", the cartesian references of this clamping being the same as on the preceding machine.

Figure 3:
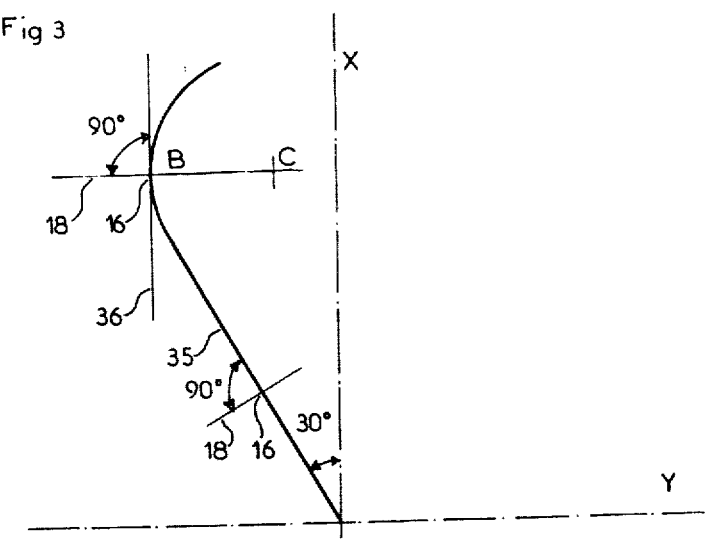
FIG. 3 is a kinematic view of the various positions of the axis of alignment of the compression means with respect to the line of movement of the machining tool.

In FIG. 3, the machining line 35, followed by the milling cutter, whose axis of rotation is 16, is a combined derivative of the axes X and Y, whatever its geometric shape, a constant exists which is perpendicular to the position of the axis of alignment 18 with respect either to the line of movement of the tool 35, when it moves along the straight line, in this example 30° from the axis (X) or to the tangent 36 of the arc (its radius is P-C) when the movement of the tool describes a curve. Starting from this fact, if one uses digital control employing a calculator, it is thus possible to create a logic arrangement governing the position of the axis of alignment 18 as a constant of perpendicularity to two abovementioned criteria, this principle is already employed in applications for orientation of a gas-cutting head, it should be noted that a digital control with three independent axes may also be used if the programming and establishment of the tape are naturally longer.

It should be noted that it is possible to use a number of blocks of varying compression and which are of different shapes. These compression blocks could also be controlled hydraulically, pneumatically, electro-pneumatically, electrically or by other methods, the posts 17 would thus be constituted by suitable jacks, the compression on the parts being machined could be calibrated, as desired, through the intermediary of pressure reducing means, attracting limiters or other methods.

Similarly, the rollers 21 could be of a completely different type, as a non-limiting example, we shall mention shoes comprising rollers, needles, or cycled balls, each of the latter being able to move in an angular manner about a horizontal axis 41, enabling the latter to oscillate about this axis in order to be able to absorb slight obstacles which may appear on the surface of the part, it would also be possible to use balls of the handling ball type, combined on supports, all these methods being fulfilled by commercially available known components, in all these cases, the device could thus be either integral with the ram 2 or the saddle 1, since it would then have autonomous clamping which does not contribute to the movement of the jack 5.

What is claimed is:

1. A machine for machining sheets, in particular for cutting out by milling metal sheets which can be cut singely and when stacked one on top of the other, comprising a rotatable machining head, a support to which the machining head is attached, an arrangement for compressing the sheets to be machined which arrangement is adapted to carry out a rotary movement during use of the machine about a longitudinal axis which is in alignment with the axis of rotation of the machining head, the arrangement comprising at least two rollers for bearing against the sheets during machining and each rotatable about a transverse axis perpendicular to said longitudinal axis, at least two guide posts on which the rollers are respectively mounted, and compression washers for resiliently biassing the rollers against the sheets, a rotatable toothed ring on which the arrangement is mounted by means of said guide posts, which ring has a longitudinal axis in alignment with the axis of rotation of the machining head, a pinion meshing with the toothed ring, a motor for driving the pinion and thereby the ring and the arrangement, angular control means which can be driven by the motor via reduction gearing in the same reduction ratio as the arrangement and which are electronically controlled whereby it is possible to control the angular position of the arrangement as required so that the said axis of rotation of the rollers can be orientated, in use, perpendicular to the direction of the machining line, when straight, and perpendicular to a tangent of the machining line, when an arc, and programmable electronic means for said angular control means which operate with reference to the angular position of the machining head.

2. A machine as claimed in claim 1, in which the guide parts comprise jacks to ensure the compression of the sheets during machining.

3. A machine as claimed in claim 1, in which the rollers comprise needles which are pivotable about said transverse axis.

4. A machine as claimed in claim 1, in which the rollers comprise cycled balls which can rotate about said transverse axis.

* * * * *